Nov. 17, 1964    S. B. ROBBINS    3,157,729
REAR VIEW MIRROR
Filed Dec. 28, 1961    2 Sheets-Sheet 1

INVENTOR.
Samuel B. Robbins
BY
Paul J. Reising
ATTORNEY

Nov. 17, 1964  S. B. ROBBINS  3,157,729
REAR VIEW MIRROR
Filed Dec. 28, 1961  2 Sheets-Sheet 2
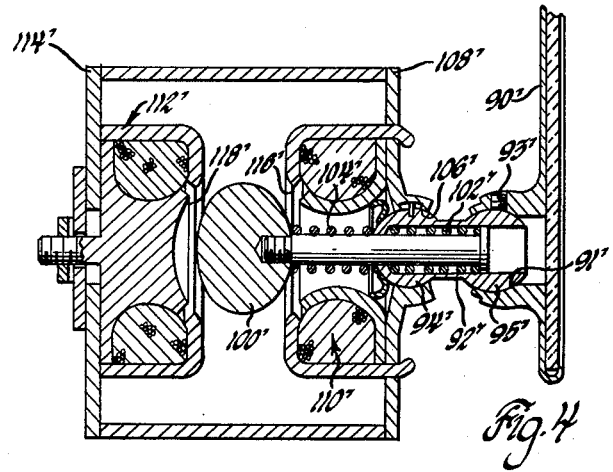
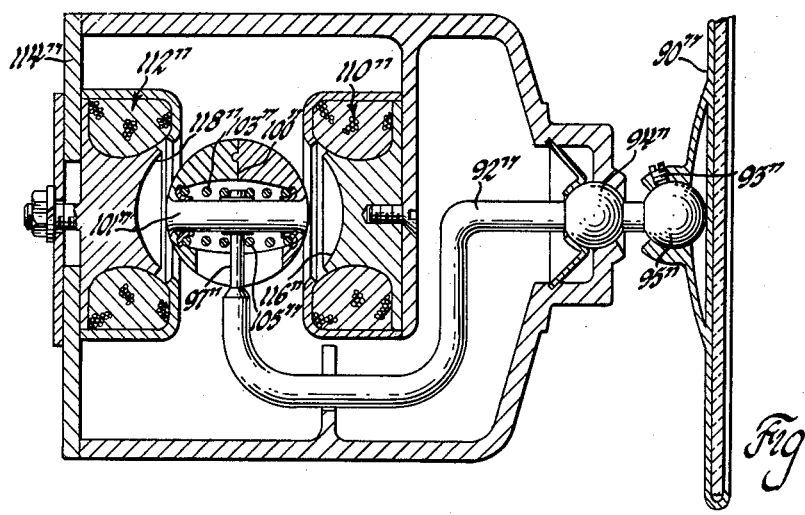
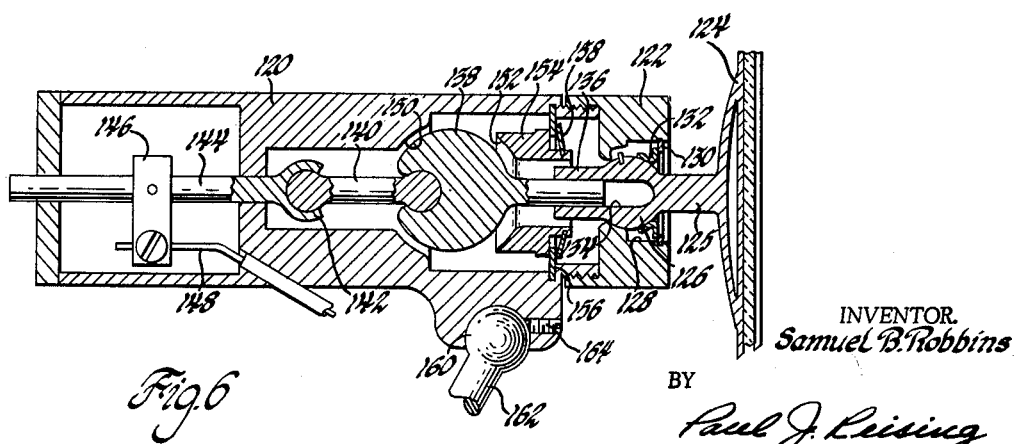
INVENTOR.
Samuel B. Robbins
BY
Paul J. Reising
ATTORNEY 3,157,729
REAR VIEW MIRROR
Samuel B. Robbins, Rochester, Mich., assignor to General Motors Corporation, Detroit, Mich., a corporation of Delaware
Filed Dec. 28, 1961, Ser. No. 162,719
11 Claims. (Cl. 88—98)

This invention concerns a rear view mirror that can be automatically positioned to present a preset rear view for one or more operators of the same vehicle by moving a selective setting member to a position corresponding to the particular operator.

Where more than one person operates the same vehicle, frequently each operator must manually adjust the rear view mirror after the other operator has used the vehicle in order to obtain a desired reflection of the traffic conditions to the rear of the vehicle. In the past, several rear view mirror structures have been proposed in which manual readjustment of the mirror is eliminated by providing two preset positions of the mirror which are alternately obtained by rotating a lever in opposite directions. In each instance, however, the proposed mirrors have not found commercial acceptance possibly because of the complicated mechanism utilized which rendered the mirror structures difficult to adjust for obtaining preset positions of the mirror, or because no remotely located actuating means was provided for moving the mirror to the preadjusted position.

Accordingly, a principal object of this invention is to provide a rear view mirror having selective adjusting mechanism of simple and durable construction wherein preset positions of the mirror are obtained readily by merely moving the mirror to a desired position so that subsequent moving of a remotely located selective setting member to a position corresponding to a particular vehicle operator results in the mirror automatically reassuming the preset position.

Briefly, the present invention contemplates a rear view mirror which is adjustable between two preset positions and includes a mirror support with a projection extending from the rear surface of the support. The projection includes means formed thereon for universally pivotally carrying the mirror support in a housing. A surface portion in the form of a ball is connected to the projection and means are provided for shifting the surface portion into mating engagement with a seating portion. The seating portion can be adjustable and movable with respect to the housing so that upon engagement of the surface portion with the seating portion, the latter is movable to a set position in response to pivotal movement of the mirror support to an adjusted position.

A more complete understanding of the subject invention can be derived from the following detailed description taken in conjunction with the accompanying drawings, in which:

FIGURE 1 discloses a rear view mirror incorporating the subject invention and being mounted on the outside of a vehicle door.

FIGURES 3, 4, 5 and 6 are sectional views of modified forms of the rear view mirror assembly shown in FIGURE 2.

Figure 1:
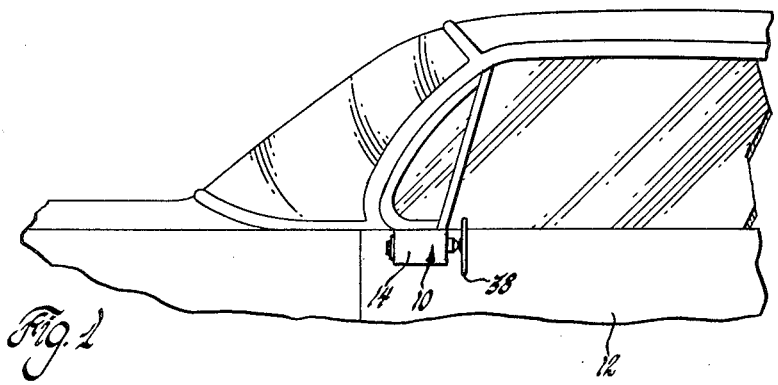
Figure 2:
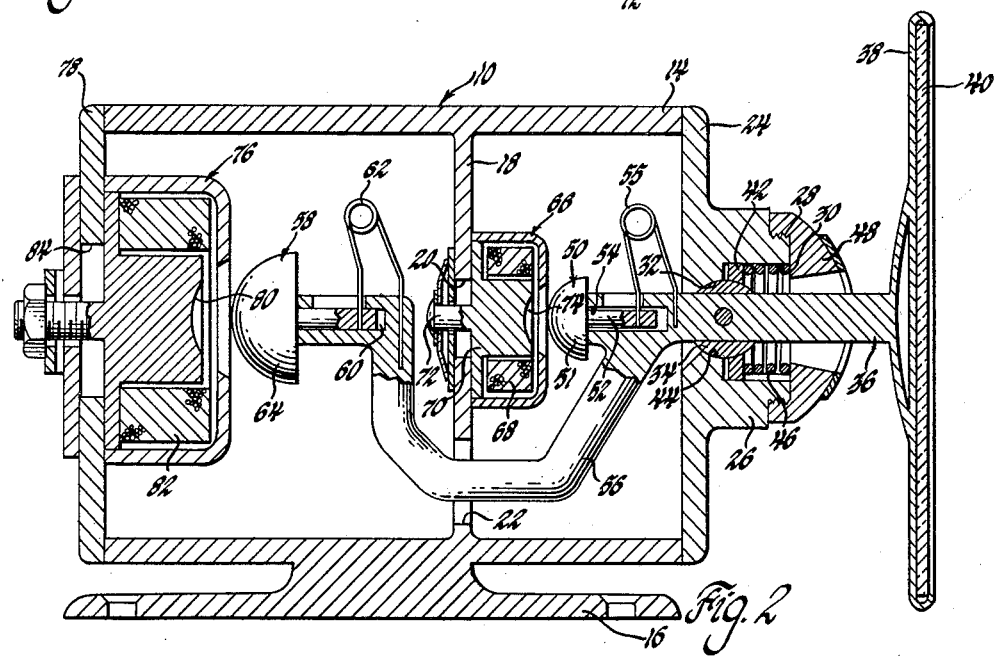
FIGURE 2 is an enlarged sectional view of the rear view mirror taken on a line extending in a direction longitudinal to the vehicle body.

Referring now to the drawings and particularly to FIGURES 1 and 2, a rear view mirror assembly 10 is shown mounted on the outside surface of a vehicle door 12, and comprises a cylindrical housing 14 having a bracket 16 that can be secured with appropriate fasteners such as screws to the outer sheet metal of the vehicle door 12.

The housing 14 is divided into two compartments by an integral partition 18 that includes circular apertures 20, 22 for respectively mounting an electromagnet and receiving a portion of a mirror support, both of which will be more fully described hereinafter. The housing is closed at one end by a hat-shaped cover 24 that includes a boss 26 extending outwardly therefrom and terminating with a reduced threaded portion 28. A bore 30 is centrally formed in the boss and connects with a spherical bearing surface 32 which is adapted to universally support a ball shaped member 34 rigidly fixed on a projection 36, which in turn, is integrally connected at one end with a mirror support 38 that carries a conventional mirror 40. The member 34 is maintained in contact with the bearing surface 32 by a washer 42 which also includes a spherical bearing surface 44 for engagement with the member 34. A coil spring 46 is interposed between the washer 42 and a cap member 48 that is threadedly secured to the boss 26 to compress the spring against the washer.

The projection 36 includes a mushroom shaped plunger 50 having a semi-spherical head 51 and a stem 52 that is slidable within a bore 54 in which it is normally maintained in the retracted position by a spring clip 55. An arm 56 having a gooseneck configuration is integrally formed with the projection 36 and also slidably mounts a similar plunger 58 that is axially aligned with the plunger 50 and resiliently held in a bore 60 by a spring clip 62. The plunger 58 has a head portion 64 which is of a greater radius than the head 51 on the plunger 50 for purposes which will hereinafter be explained.

An electromagnet 66 having the usual coil 68 wound around a metal core 70 is mounted opposite the plunger 50 on the wall 18 by a fastener arrangement that frictionally engages the wall surface and connects with a leg 72 that extends from the core 70 and through the aperture 20. A semi-spherical seating portion 74 is provided in the electromagnet 66 for receiving the curved head 51 of the plunger 50 for purposes which will hereinafter be explained. A similar electromagnet 76 is frictionally secured to an end wall 78 by the nut and washer arrangement shown, and as with the electromagnet 66 includes a semi-spherical seating portion 80 for accommodating the head 58 upon energization of the coil 82. The seating portion 80 is of a radius greater than that formed in the electromagnet 66 and in addition, the aperture 84 in the wall 78 is larger so as to provide a greater range of adjustment of the electromagnet 76.

Although not shown in the drawings, the coils in the respective electromagnets are connected in an electric circuit which receives power from a source such as an automobile battery and includes an appropriate selective setting or control member in the form of a switch which is moved to a position corresponding to the particular vehicle operator for energizing one of the electromagnets. The switch can be secured to the instrument panel of the vehicle within convenient reach of a vehicle operator so that upon manual movement of a switch actuator in one direction the electromagnet 66 is energized, and movement of the switch actuator in an opposite direction serves to energize the electromagnet 76.

In operation, assuming the first vehicle operator desires to adjust the mirror assembly for a particular preset rear view, a switch actuator is moved to energize, for example, the electromagnet 66 thereby creating a magnetic field which causes the plunger head 51, which acts as an armature, to move into mating engagement with the spherical bearing surface 74 formed in the core 70. Thereafter the electromagnet and projection 36 are fixed together as a unit by the plunger, and upon manual adjustment of the mirror support 38 to the position desired by the operator, the electromagnet 66 moves in response to this adjustment and assumes a new position in the opening 20. The frictional connection between the electromagnet and wall 18 permits this movement, and in addition serves to maintain the electromagnet in the new position determined by the adjusted mirror. Upon obtaining the desired rear view, the electromagnet 66 is deenergized by returning the switch actuator to its normal position thereby permitting the clip spring 55 to retract the plunger 50 to the position shown in FIGURE 1. Subsequent re-energization of the electromagnet 66 causes the head 51 of the plunger 50 to move into the adjusted seating position of the electromagnet 66 and reposition the mirror support 38 in the exact position set originally by the operator regardless of whether the mirror had been subsequently moved to a different position.

A similar adjustment is made by the second vehicle operator, however, in this instance, the switch actuator is moved to energize the electromagnet 76 causing the head 64 of the plunger 58 to move against the bias of the clip spring 62 into the spherical seating portion 80. The mirror support 38 and the associated mirror 40 are then adjusted for the desired rear view causing the electromagnet 76 to reposition itself in accordance with this adjustment. The electromagnet 76 is then deenergized to cause a disengagement of the head 64 with the seat 80 and because of the frictional connection with the wall 78 the electromagnet 76 will also maintain the adjusted position. It should be apparent from the above that with the electromagnets 66 and 76 adjusted as described above, each operator upon entering the vehicle need only to energize the appropriate electromagnet so as to draw the plunger into the seating portion thereof to obtain the pre-adjusted position of the mirror. Furthermore, it should be noted that because the plunger 58 is located farther from the pivot 34 then the plunger 50, the former moves through a greater distance for any movement of the mirror support 38. Therefore, to compensate for this increase in travel, the plunger 58 has a larger head and the electromagnet 76 is mounted through an aperture having a larger diameter than the corresponding parts associated with the electromagnet 66.

Figure 3:
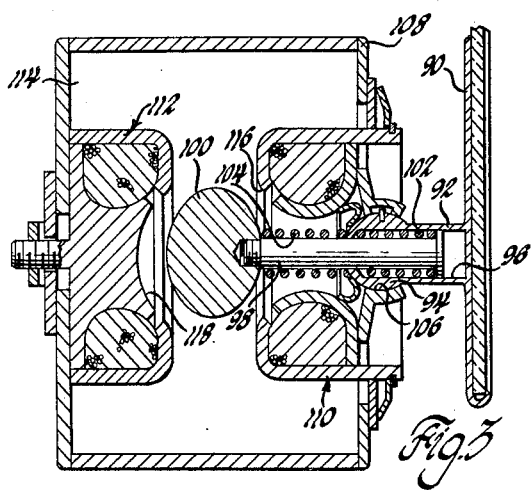

Referring now to FIGURE 3, a modification of the rear view mirror assembly of FIGURE 2, is shown and in this embodiment a mirror support 90 is integrally formed with a projection 92 which terminates in a ball portion 94 and includes an axial bore 96 formed therein adapted to slidably receive one end of a shaft 98. The other end of the shaft 98 is connected to a ball member 100 and a pair of coil springs encircle the shaft for resiliently maintaining the ball member 100 in the neutral position shown between two spaced electromagnets 110 and 112. One of the springs 102 is located within the bore 96 between a shoulder on the shaft and a flange formed with the ball member 94, while one end of the other spring 104 engages the ball member 100 and the opposite end contacts the outer surface of the ball portion 94 formed on the projection 92. The ball portion 94 is universally pivotally supported by a spherical bearing surface 106 connected to a cover plate 108 that closes one end of the mirror assembly housing. Although not shown in the drawing, the cover plate 108 is connected with the bearing surface 106 by a plurality of web members, the openings between which serve to accommodate projecting arms extending from the electromagnet 110 which is frictionally secured to plate 108 by a spring-washer arrangement. As in the mirror assembly shown in FIGURE 2, the second electromagnet 112 is frictionally secured to an end plate 114 by a nut-washer arrangement. Each electromagnet includes the conventional coil which when energized creates a magnetic field for drawing the ball member 100 into mating engagement with the seating portions 116 and 118 formed in the respective electromagnets 110 and 112.

In operating the mirror assembly of FIGURE 3, the first vehicle operator moves the selective setting member or switch actuator to energize one of the electromagnets causing the ball 100 to move into mating engagement with the seating surface formed therewith. Subsequent manual adjustment of the mirror support 90 causes a corresponding movement of the electromagnet with the ball portion 94 acting as a pivot point. For example, assuming electromagnet 110 is energized and ball 100 mates with seat 116, movement of the mirror support 90 to the desired position causes a repositioning of electromagnet 110 within the confines of the spaces formed between the web members, and upon de-energization of the electromagnet, the spring 104 returns the ball member 100 to its neutral position. Thereafter, this preset position of the mirror can be automatically obtained by energizing electromagnet 110. Energization of the electromagnet 112 by the second operator moves the ball 100 against the bias of the spring 102 and into mating engagement with the spherical seating portion 118 formed in the core of the electromagnet. This is followed by manual positioning of the mirror support for the desired rear view causing a readjustment of electromagnet 112 so that upon subsequent energization of this electromagnet, the desired preset position of the mirror support is obtained by the second operator.

FIGURE 4 shows a modification of the rear view mirror assembly of FIGURE 3 that differs only in that the electomagnet 110' is rigidly fixed in position while the other electromagnet 112' is adjustable in a manner similar to that in the prior disclosures. Also, the projection 92', in this instance, terminates with ball portions 94' and 95' at opposite ends thereof. This assembly has a mirror support 90' that includes an integral socket portion 91' which coacts with the ball portion 95' for universally pivotally supporting the mirror support 90'. A set screw 93' is carried by the mirror support for engagement with the ball portion 95' so as to maintain a preset position of the mirror upon tightening of the screw.

To obtain a first preset position of the mirror support 90', the electromagnet 110' is energized causing the ball 100' to move against the bias of spring 104' into mating engagement with the seating portion 116'. At this time, because of the rigid connection between the electromagnet 110' and the retaining wall 108', the engagement of the ball member 100' and seat 116' serves to lock the projection 92' in a horizontal position and movement of the mirror support 90' is only permitted about the ball 95'. Therefore, to obtain the first preset position of the mirror, the set screw 93' is loosened and the mirror support 90' is manually adjusted followed by retightening of the set screw. Subsequent movement of the mirror support about the ball 94' will be ineffective to change the relationship of the mirror support with respect to the projection 92', and consequently upon energization of the electromagnet 110' the mirror support 90' will reposition the mirror to the first preset position.

The second preset position of the mirror is obtained by utilizing electromagnet 112' and upon energization thereof, the ball 100' moves against the bias of spring 102' into the spherical seating portion 118'. Manual movement of the mirror support 90' at this time causes pivotal movement of the ball portion 92' in the socket 106' with corresponding movement of the electromagnet 112' which is frictionally secured to the wall 114' by the associated nut and washer arrangement. Thereafter, either the first or second adjusted position of the mirror can be automatically obtained by energizing the electromagnet corresponding to the particular vehicle operator.

The mirror construction shown in FIGURE 5 is similar to that of FIGURE 4 in that the electromagnet 110" is rigidly secured to the housing while the electromagnet 112" is adjustably mounted to the end wall 114". However, this structure differs in that the ball portions 94" and 95" are integrally formed with a gooseneck type projection 92" that extends into the housing and terminates with a slidable ball member 100". The ball member 100" is connected to a pin 101" that passes through an opening formed at the end portion 97" of the projection 92″ and includes separate coil springs 103″ and 105″ provided on the pin 101″ at opposite sides of the end portion 97″ for normally maintaining the ball member in a position intermediate the seating portions 116″ and 118″. As in the prior construction a set screw 93″ is carried by the mirror support 90″ for fixing the latter in a desired position with respect to the projection 92″ to realize a first preset mirror position. The latter adjustment is made, as in the embodiment of FIGURE 4, when the electromagnet 110″ is energized to draw the ball 100″ into mating engagement with the seating portion 116″ of the electromagnet 110″. Upon making the desired manual adjustment of the mirror support 90″, the set screw 93″ is tightened so as to fix the position of the mirror with respect to the projection. The electromagnet 110″ is then de-energized causing the ball 100″ to return to its neutral position to free the projection 92″ for movement about ball portion 94″.

When the electromagnet 112″ is energized, the ball 100″ moves into engagement with the seating portion 118″ and because this electromagnet is movable, manual adjustment of the mirror support 90″ pivots the projection 92″ about the axis of ball 94″ and causes movement of the electromagnet 112″ to a position determined by the operator in a manner as aforedescribed with regard to the mirror structure shown in FIGURE 4. The latter adjustment positions the mirror in the second preset position.

Finally, FIGURE 6 shows a mechanical or cable operated rear view mirror assembly that is capable of positioning the mirror into two preset adjusted positions as in the aforedescribed electrically operated assemblies. This mirror assembly comprises a cylindrical housing 120 having a cap 122 threadedly secured thereto at one end. A mirror support 124 includes a projection 125 having an integral ball portion 126 that is universally pivotally retained within a centrally formed opening 128 in the cap member by a lock washer 130 that urges an annular bearing member 132 into contact with one portion of the ball 138. An elongated bore 134 is coaxially formed in the projection 125 for slidably retaining a stem 136 integrally formed with a ball member 138, which in turn, universally carries an intermediate connector 140 which has the opposite ends thereof formed as a ball. One end of the connector 140 is universally set within a socket portion 142 that constitutes the inner end of a shiftable shaft 144. A mounting plate 146 is fixed to the shaft 144 and rigidly retains one end of a wire 148 that passes through a sheath to be connected at the opposite end with a control member or knob (not shown) mounted on the vehicle instrument panel or within convenient reach of the vehicle operator for moving the wire with accompanying shiftable movement of the shaft. The housing is formed with an integral spherically shaped seating portion 150 located adjacent the ball 138 and serving as a seat therefor upon movement of the shaft 144 in a direction toward the rear of the housing. A second ball seating portion 152 is formed in a tubular member 154 which is frictionally secured to an annulus 156 which in turn, is rigidly set at the periphery thereof in an annular groove formed in the housing. A spring washer 158 frictionally engages the annulus 156 and permits adjustment of the tubular member 154 within the annulus opening.

The housing 120 is universally mounted on a ball portion 160 of a support stem 162 which can be attached through suitable means to the vehicle door to provide universal adjustment of the entire housing about the ball portion 160. A set screw 164 is carried by the housing for engagement with the ball portion of the stem support 162 so that upon adjusting the housing to its desired position, the set screw may be tightened against the ball so as to maintain the housing in this position.

The operation of this rear view mirror assembly is similar to that of the assemblies shown in FIGURES 4 and 5 in that the first preset position is obtained by causing mating engagement between the ball 138 and the rigid seating portion 150 so as to fixedly connect the mirror support to the housing. This occurs when the knob is manually moved so as to shift the wire 148 and the connected shaft 144 towards the rear of the mirror assembly or to the left as shown in FIGURE 6. This movement is followed by manually positioning of the mirror support 124 for the desired reflection which, in this instance, causes the entire housing 120 to pivot about the ball 160 of the stem support 162. Upon obtaining the desired reflection the set screw 164 is tightened so as to securely position the housing 120 and thereby assure that the mirror support 124 returns to the present position, whenever the ball 138 mates with the seating portion 150. A second preset mirror position for a different operator is obtained by moving the knob so as to shift the wire 148 and shaft 144 towards the mirror support or to the right, as seen in FIGURE 6, so as to set the ball 138 in the adjustable seating portion 152. Manual adjustment of the mirror support 124 then repositions the adjustable tubular member 154 in the annulus 156 and the second preset position of the mirror may subsequently be obtained at any time by merely drawing or pulling on the knob to place the ball 138 in the adjusted position of the seating portion 150.

Various changes and modifications can be made in the subject rear view mirror assembly without departing from the spirit of the invention. Therefore, it should be understood that these changes and modifications are contemplated and I do not wish to be limited beyond the scope of the appended claims.

What is claimed is:

1. A rear view mirror assembly for a vehicle, comprising a housing adapted to be fixed in position on said vehicle, a mirror support having a projection extending from the rear surface thereof, first means universally pivotally connecting the projection on said housing, a plunger member having a convex surface portion, said plunger being reciprocably supported on said projection at a point spaced from said means, a seating member having a concave surface portion for accommodating the convex surface of the plunger member and being supported on said housing, second means operatively connected with one of said members for causing said plunger to move into engagement with the seating member, third means frictionally supporting the seating member on said housing so that manual movement of the mirror support causes the seating member to move relative to the housing to an adjusted position when said members are engaged, said third means adapted to hold said seating member in position after movement thereof so that subsequent engagement of said members serves to automatically move the mirror support to said adjusted position.

2. The device of claim 1 wherein resilient means are interposed between the plunger member and projection for disengaging said surface portions whenever said second means is deactivated.

3. The device of claim 1 wherein said seating member is an electromagnet which upon energization causes the plunger to be drawn thereto.

4. The device of claim 1 wherein said third means supports the seating member for adjustable movement in a plane transverse to the path of movement of said plunger member.

5. The device of claim 1 wherein said second means comprises a flexible cable operatively connected at one end to said plunger member and adapted to be connected at the other end to a remotely located actuator.

6. A rear view mirror assembly for a vehicle, comprising a housing adapted to be fixed in position on said vehicle, a mirror support, a projection, first means universally pivotally connecting said mirror support to one end of said projection, second means spaced from the first means for universally pivotally connecting the projection to the housing, a plunger member having a first surface portion, said plunger member being reciprocably supported on said projection at a point axially spaced from the second means, a seating member having a second surface portion for accommodating the first surface portion, means rigidly connecting said seating member to said housing, and third means supported by the housing for causing said members to move into engagement with each other whereby said projection is placed in a preset and locked position relative to the housing, said first means permitting manual movement of said mirror support relative to the projection and to an adjusted position so that a desired view is obtained when the third means is actuated, and fourth means on said mirror support for locking the latter to the projection when said desired view is obtained and said surface portions are engaged so that upon subsequent actuation of said third means said mirror support automatically assumes the preadjusted position.

7. The rear view mirror assembly of claim 6 wherein spring means are operatively connected to said plunger member for disengaging said surface portions whenever said third means are deactivated.

8. The rear view mirror assembly of claim 6 wherein said seating member is an electromagnet which upon energization causes the plunger to be drawn thereto.

9. The rear view mirror assembly of claim 6 wherein said first and second surface portions are respectively convex and concave in form.

10. A rear view mirror assembly for a vehicle, comprising a housing adapted to be fixed in position on said vehicle, a mirror support having a projection extending from the rear surface thereof and into said housing, means universally pivotally connecting the projection to said housing, a first surface portion supported on said projection at a point spaced from said means, a second surface portion supported on said housing and normally spaced from the first surface portion, one of said surface portions being movable relative to its support for engagement with the other surface portion, said first and second surface portions being complementary in shape and so angularly related with respect to the movement of the one of said surface portions that engagement of the two results in a mating action that locks and locates said first surface portion relative to the second surface portion, means operatively connected with one of said surface portions for causing said surface portions to move into mating engagement, means frictionally supporting said second surface portion on said housing so that manual movement of the mirror support for a desired view causes the second surface to move relative to the housing to an adjusted position when said first and second surface portions are engaged, said last-mentioned means adapted to hold said second surface in position after movement thereof so that subsequent engagement of said first and second surface portions serves to automatically move the mirror support to said adjusted position.

11. A rear view mirror assembly for a vehicle, comprising a housing adapted to be fixed in position on said vehicle, a mirror support, a projection, first means universally pivotally connecting said mirror support to one end of said projection, second means spaced from the first means for universally pivotally connecting the projection to the housing, a first surface portion supported on said projection at a point axially spaced from the second means, a second surface portion supported on said housing and normally spaced from the first surface portion, one of said surface portions being movable relative to its support for engagement with the other surface portion, the other of said surface portions being rigidly connected to its support, said first and second surface portions being complementary in shape and so angularly related with respect to the movement of the one of said surface portions that engagement of the two results in a mating action that locks and locates said first surface portion relative to the second surface portion, third means supported by the housing for causing said one of said surface portions to move into mating engagement, said first means permitting manual movement of said mirror support relative to the projection and to an adjusted position so that a desired view is obtained when the third means is actuated, and fourth means on said mirror support for locking the latter to the projection when said desired view is obtained and said surface portions are engaged so that upon subsequent actuation of said third means said mirror support automatically assumes the preadjusted position.

References Cited in the file of this patent

UNITED STATES PATENTS

| | | |
|---|---|---|
| 2,504,386 | Brady et al. | Apr. 18, 1950 |
| 2,919,599 | Milton et al. | Jan. 5, 1960 |
| 3,026,771 | Kowlton et al. | Mar. 27, 1962 |
| 3,059,539 | Meade | Oct. 23, 1962 |